United States Patent [19]

Weber

[11] Patent Number: 5,255,517
[45] Date of Patent: Oct. 26, 1993

[54] CONTROL DEVICE FOR HYDRAULIC OPERATING CYLINDERS OF A COMBINED LIFTING PLATFORM AND A CLOSING WALL OF A VEHICLE

[76] Inventor: Günter Weber, Hauptplatz 23, A-2474 Gattendorf, Austria

[21] Appl. No.: 838,406
[22] PCT Filed: Sep. 10, 1990
[86] PCT No.: PCT/AT90/00090
  § 371 Date: Mar. 3, 1992
  § 102(e) Date: Mar. 3, 1992
[87] PCT Pub. No.: WO91/04169
  PCT Pub. Date: Apr. 4, 1991

[30] Foreign Application Priority Data
Sep. 13, 1989 [AT] Austria ............................... 2139/89

[51] Int. Cl.$^5$ ............................................. F16D 31/02
[52] U.S. Cl. .......................................... 60/431; 60/426; 91/515; 91/532
[58] Field of Search ............... 60/420, 422, 426, 431, 60/432; 91/511, 514, 517, 518, 532, 433

[56] References Cited

U.S. PATENT DOCUMENTS

| | | |
|---|---|---|
| 2,229,561 | 1/1941 | Galanot . |
| 2,326,594 | 8/1943 | Wood . |
| 2,611,246 | 9/1952 | Ackerman ..................... 60/431 |
| 2,892,312 | 6/1959 | Allen et al. ..................... 60/427 |
| 3,727,520 | 4/1973 | McKown et al. .............. 91/433 |
| 3,811,458 | 5/1974 | Kuhnelt ......................... 91/433 X |
| 3,868,062 | 2/1975 | Cunningham et al. ........ 91/518 X |
| 4,192,337 | 3/1980 | Alderson et al. .............. 60/420 X |
| 4,505,111 | 3/1985 | Okamoto et al. .............. 60/431 |
| 4,617,854 | 10/1986 | Kropp ........................... 60/422 X |

FOREIGN PATENT DOCUMENTS 2646 12/1976 Japan .
2070692 9/1981 United Kingdom .

Primary Examiner—Edward K. Look
Assistant Examiner—Hoang Nguyen
Attorney, Agent, or Firm—Frishauf, Holtz, Goodman & Woodward

[57] ABSTRACT

A control device for hydraulic operating cylinders of a combined lifting platform and closing wall of a vehicle, having a hydraulic fluid pump (1), driven by a motor (2), which pump can be made to communicate with a fluid supply (4) and, via pump branch lines (8', 8") beginning at a pump line (8), with a chamber of at least one lifting cylinder (11) and of at least one closing cylinder (14) of the lifting platform and closing wall, respectively, via associated control valves (9, 10; 12, 13), wherein a pressure transformer and piston cylinder unit (15) is connected parallel to the pump branch lines (8', 8"). The pressure transformer is coupled to either an electrical switch (16), with which the pump motor (2) can be shut down if a predetermined pressure is exceeded; or to an adjustable hydraulic valve, by way of which the pump branch lines (8', 8") can be blocked off, or the pump line (8) can be made to communicate with a return line (7) to the fluid supply (4), and with which the pump motor (2) can optionally be shut down.

7 Claims, 2 Drawing Sheets

CONTROL DEVICE FOR HYDRAULIC OPERATING CYLINDERS OF A COMBINED LIFTING PLATFORM AND A CLOSING WALL OF A VEHICLE

FIELD OF THE INVENTION

The present invention relates to a control device for hydraulic operating cylinders of a platform to be used with vehicles which can be raised and lowered, to place loads on the platform and, by then rotating the platform about an axis close to one end of the platform, forming a closing wall, and more particularly to such a device which operates reliably even if the load on the platform is located off center, or is excessive.

BACKGROUND

It is known to provide a motor-driven hydraulic fluid pump which can be made to communicate with the fluid supply and, via pump branch lines beginning at a pump line, with a chamber of at least one lifting cylinder and of at least one closing cylinder, which rotates the lifting platform and closing wall combination, respectively, via associated control valves. A pressure transformer and piston cylinder unit is connected across the pump branch lines.

In previously known control devices of this type, a problem has arisen in practice that, if the load is not positioned on the combination lifting platform and closing wall in accordance with regulations, or directions of use, for example being off-center or an overload, tilting torques may arise which translate into increased tensile and compressive forces in the lifting arms and in the closing cylinders of the combination platform and closing wall. For example, the allowable forces may be exceeded by up to a factor of 5, which can damage or destroy the lifting arms and/or the closing cylinders.

THE INVENTION

It is an object of the invention to provide a device which, in case of unbalanced placement of loads, averts the dangers discussed above.

Briefly, a pressure-responsive element, such as an electrical switch, is provided which shuts down the pump drive motor in case an overload is sensed. The pressure-responsive device is coupled to the smaller one of the cylinder-piston chambers of the pressure transducer, which provides for a simple connection. Alternatively, the pressure sensing device may be a hydraulic pressure sensor, sensing the pressure in the smaller one of the piston-cylinder chambers of the pressure transducer. The action of this pressure sensor is such that the branch lines can be blocked off, or the pump line, providing a main hydraulic supply, is hydraulically coupled to a return line to the fluid supply; optionally, the pump motor can also be shut down, under hydraulic overpressure.

As a result, in a structurally simple manner, the pump motor is shut down and/or the hydraulic fluid feed line is blocked before an overload or unbalance may cause damage, for example to the components to the lifting platform and closing wall such as the lifting arms and closing cylinders.

In accordance with a preferred feature of the invention, a counter mechanism for counting the number of times that pressure is exceeded can be activated by the pressure sensor, either by the electric pressure switch, or by the adjustable hydraulic pressure sensor which, in a simple form, is an adjustable hydraulic valve.

DRAWINGS

The invention is described in further detail below in terms of exemplary embodiments, referring to the drawings, in which:

FIG. 1 shows a hydraulic circuit diagram of a control device according to the invention; and FIG. 2 is a circuit diagram of an alternative embodiment.

DETAILED DESCRIPTION

Figure 1:
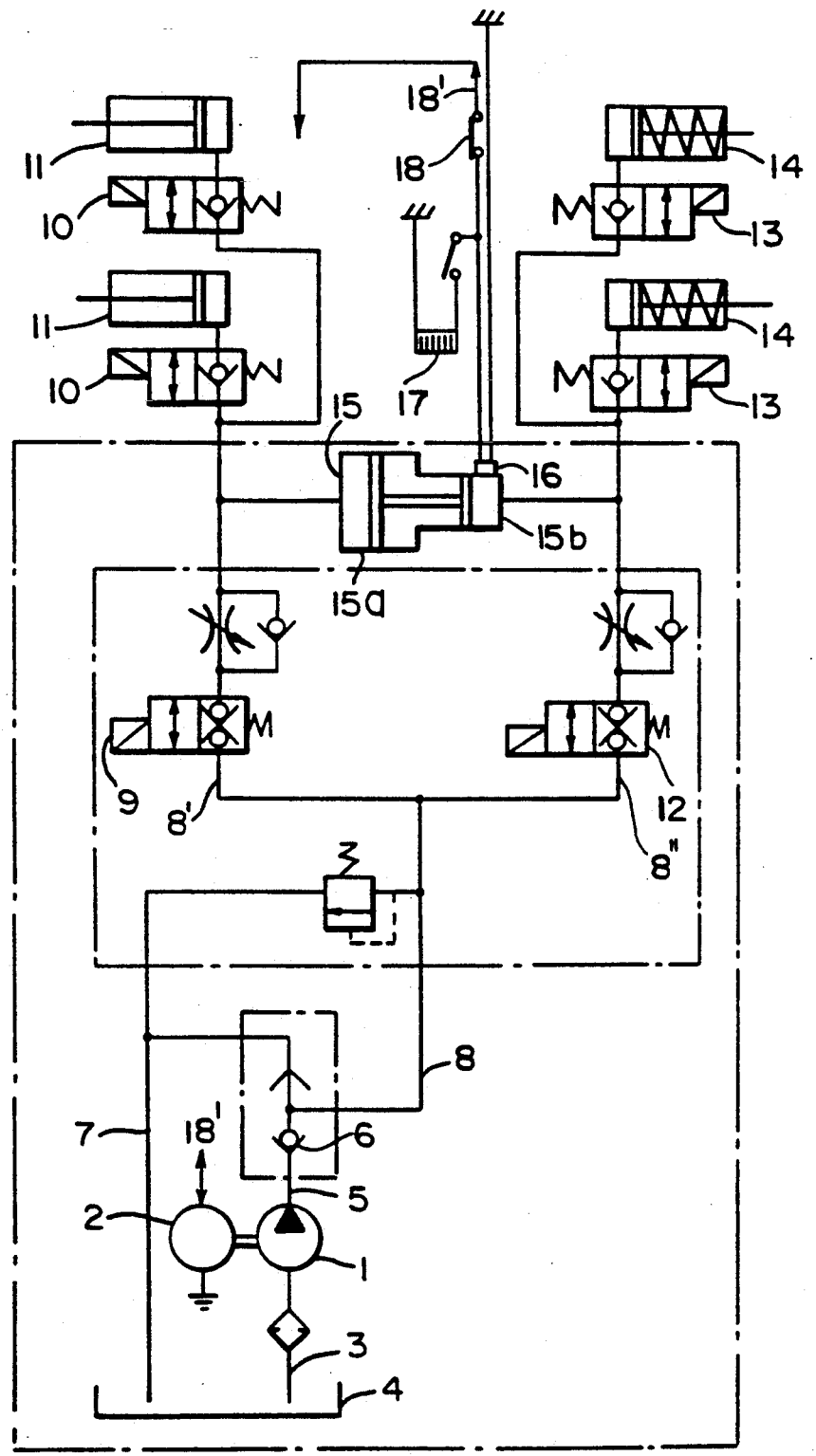

According to FIG. 1, a hydraulic fluid pump 1 is driven by an electric motor 2 and communicates via a line 3 with a hydraulic fluid supply 4. The pump 1 also communicates to a hydraulic system via a pump line 5, which includes a check valve 6, with a fluid return line 7 and with a line 8 that branches into branch lines 8', 8". The left-hand branch 8' in FIG. 1, via a controllable lifting valve 9 and two controllable lifting cylinder valves 10, feeds two lifting cylinders 11 of the lifting platform and closing wall, which is not shown.

Analogously, the right-hand branch line 8" in FIG. 1, via a controllable closing valve 12 and two controllable closing cylinder valves 13, feeds two closing cylinders 14 to rotate the lifting platform and closing wall. Between the valve 9 and 10 on one side and the valve 12 and 13 on the other, a pressure transformer and piston-cylinder unit 15, the larger cylinder-piston end 15a of which is oriented toward the lifting cylinder, is connected to the branch lines 8', 8".

The typical operation of such a combination loading and lifting platform and closing wall is this:

Let it be assumed that hydraulic pressure is present, namely that motor 2 operates pump 1. The cylinders 11 control down-up, that is, dropping and lifting movement of the combination platform-wall. The cylinders 14 control rotation of this combination loading and lifting platform and closing wall between horizontal and vertical orientation, pivoting about an axis close to the vehicle. When the platform is in essentially horizontal position, a load can be placed thereon and the load lifted. When the load then is even with the vehicle loading bay, the platform is rotated so that it will be in a vertical position, thus forming a closing wall for the vehicle. In addition, rotation about that axis of the platform is possible to permit the platform to tip somewhat downwardly at the end removed from the rotation axis, that is downwardly from a horizontal position, to permit rolling a load on the platform. The platform can then be rotated again into a horizontal position for lifting. This lifting movement is controlled by the lifting cylinder 11. All rotary movements, that is from a horizontal to a slightly downwardly tipped position for loading, and later from the horizontal to a vertical position to form a closing wall, is controlled by the closing cylinders 14. These operations are well known and standard in this field.

The present invention addresses itself to the problem which arises when the load is placed on the platform, when the platform is tilted downwardly for loading, and it is then attempted to tilt the platform back into a horizontal position so that, subsequently, can be raised, and to prevent damage if the load is excessive or placed in an unbalanced condition on the platform.

In accordance with a feature of the invention, a pressure sensor is coupled to the smaller cylinder-piston chamber 15b of the pressure transformer and piston cylinder unit 15. As shown in FIG. 1, this pressure sensor is an electrical switch 16. Switch 16 is electrically connected to a counting mechanism 17, and to an interrupter switch 18 which controls electric energy for the electrical pump motor, as shown schematically by connection line 18'

The pressure switch 16, for example, can be set to 220 bar if the left-hand side, or larger side 15a of the pressure transformer 15 is set to 180 bar.

A counting mechanism 17 is provided, sealed inside the control system of the loading and lifting platform and closing wall combination. Each time an overload is sensed, it switches onward by one digit in order to record the number of times the load is exceeded over a relatively long period of time.

Figure 2:
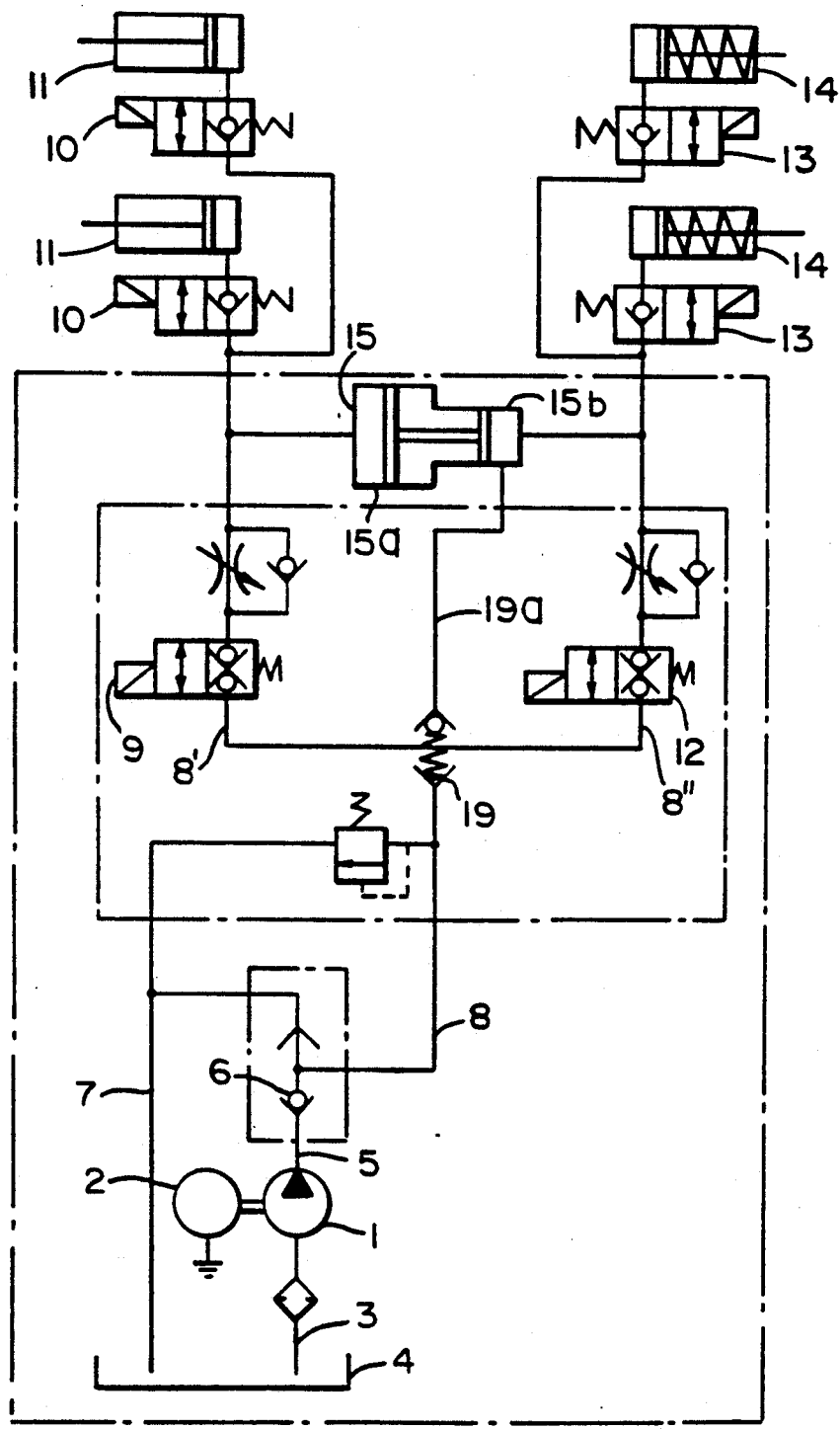

According to the embodiment shown in FIG. 2, the pressure switch 16 of FIG. 1 is replaced by an adjustable hydraulic switch-over valve or cut-off valve 19. The cut-off valve 19 is connected to the smaller chamber 15b of the pressure transformer and piston cylinder unit 15. This valve 19 is incorporated into the branching point or junction of the branch lines 8', 8" and blocks them off if a predetermined pressure, for instance 220 bar, is exceeded. Optionally, the electrical pump motor feed line can also be interrupted via this hydraulic valve by a suitable electrical connection.

Instead of the hydraulic valve 19 shown, a piston slider or the like could be provided. A counter mechanism can also be activated via the hydraulic valve, analogously to the counting mechanism 17.

Optionally, and referring to FIG. 2, the hydraulic valve 19 may be so constructed that, in the event of an overload, the pump line 8 is placed into bypass communication with the fluid return line 7, so that the pump 1 idles.

The invention is not limited to the examples shown. On the contrary, they can be modified in various ways within the scope of the general concept of the invention.

I claim:

1. A control device for a hydraulic operating circuit of a combination loading and lifting platform and closing wall of a vehicle, having
   a hydraulic fluid pump (1) communicating with a fluid supply (4) of pressure fluid;
   a motor (2) driving said pump;
   a hydraulic system including
   a first branch line (8') hydraulically connected to said pump;
   a lifting cylinder (11) coupled to said first branch line (8') for lifting said combination platform and closing wall;
   a first control valve (9) controlling admission and drainage of pressurized fluid to said lifting cylinder (11);
   a second branch line (8") hydraulically connected to said pump;
   a rotation cylinder (14) coupled to said second branch line (8") for rotating the combination loading and lifting platform and closing wall between a downwardly tipped position, an essentially horizontal and vertical position,
   a second control valve (12) for controlling admission and drainage of pressurized fluid to said rotation cylinder (14); and
   a hydraulic pressure transformer piston-cylinder element (15) hydraulically connected across said first and second branch lines, and having a larger piston-cylinder chamber (15a) and a smaller piston-cylinder chamber (15b),
   and comprising, in accordance with the invention,
   means (16, 19) for determining an overload or unbalance of load placed on the combination platform and closing wall upon application of hydraulic pressure to the second branch line (8") for rotation of the combination platform by said rotation cylinder (14),
   said means including pressure sensing means (16, 19) coupled to the smaller piston-cylinder chamber (15b), said pressure sensing means being connected to and controlling interruption of application of hydraulic pressure from said fluid pump (1) to said hydraulic system when the pressure sensing means (16, 19) senses occurrence of a pressure beyond a predetermined limit in said smaller piston-cylinder chamber (15b).

2. The system of claim 1, wherein said pressure sensing means comprises an electrical over-pressure sensor switch (16) coupled to said smaller piston-cylinder chamber (15b) of said hydraulic pressure transformer (15), and electrically connected to interrupt energization to said motor (2) driving said pump.

3. The system of claim 1, wherein said pressure sensing means comprises a pressure sensing valve (19), said pressure sensing valve being hydraulically connected to an output line (8) from said pump to inhibit application of hydraulic pressure to said first and second branch lines (8', 8").

4. The system of claim 1, further including a counter (17) coupled to said pressure sensing means (16, 19) for counting the number of times the pressure is exceeded.

5. The system of claim 2, including a counter (17) coupled to said switch (16).

6. The system of claim 3, including a counter (17) coupled to said pressure sensing valve (19).

7. The system of claim 3, wherein said pressure sensing valve is hydraulically connected to block hydraulic communication between the pump (1) and said first and second branch lines (8', 8").

* * * * *